N. D. LEVIN.
RACK RAIL.
APPLICATION FILED DEC. 17, 1906.
1,042,452.
Patented Oct. 29, 1912.
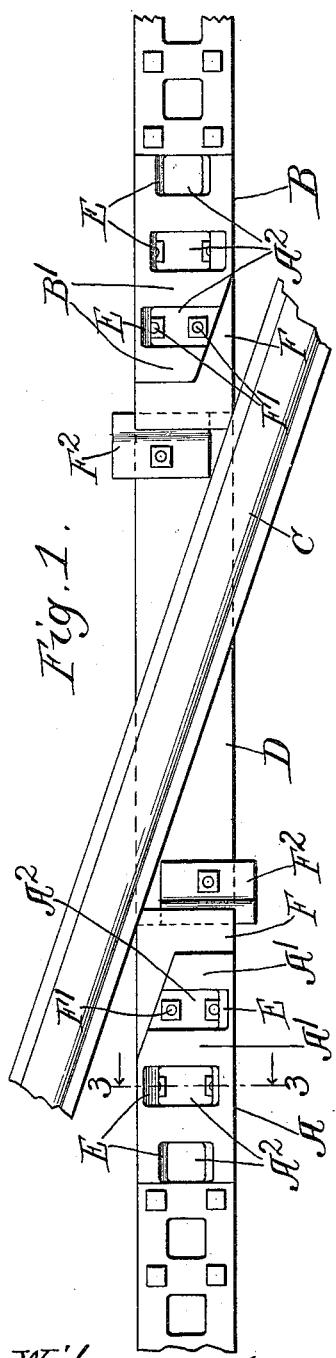
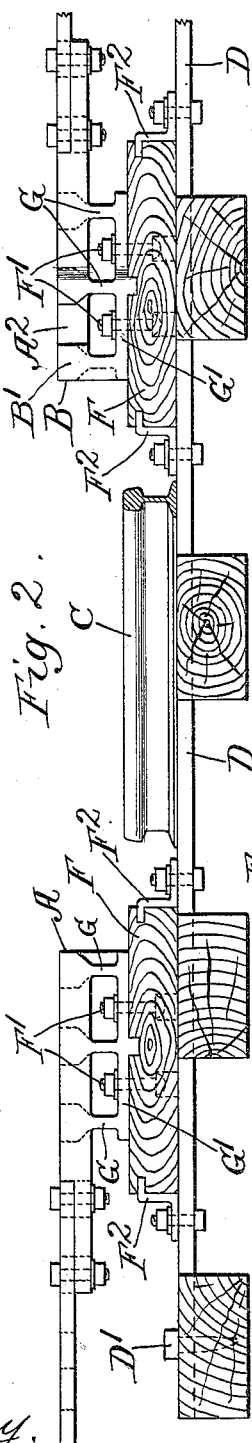
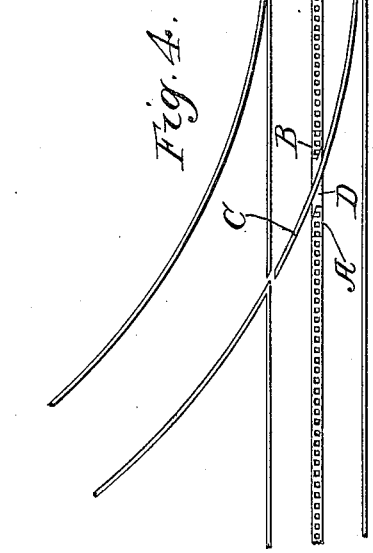
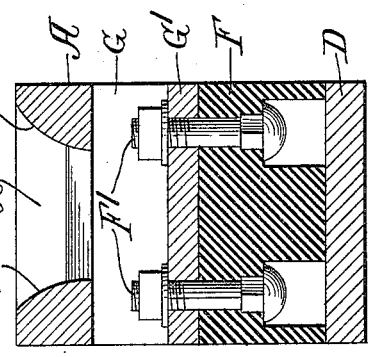
Witnesses.
Edward T. Wray.
Edna K. Reynolds.
Inventor.
Nils D. Levin
by Parker & Carter
Attorneys.

UNITED STATES PATENT OFFICE.

NILS DAVID LEVIN, OF CHICAGO, ILLINOIS, ASSIGNOR TO GOODMAN MANUFACTURING COMPANY, OF CHICAGO, ILLINOIS, A CORPORATION OF ILLINOIS.

RACK-RAIL.

1,042,452.  Specification of Letters Patent.  Patented Oct. 29, 1912.

Application filed December 17, 1906. Serial No. 348,351.

*To all whom it may concern:*

Be it known that I, NILS D. LEVIN, a citizen of the United States, residing at Chicago, in the county of Cook and State of Illinois, have invented a certain new and useful Improvement in Rack-Rails, of which the following is a specification.

This invention relates to improvements in rack rails, for rack rail locomotives, and has for its object to provide a new and improved device of this description.

The invention is illustrated in the accompanying drawings, wherein—

Figure 1 is a plan view of a rack rail showing one form of construction; Fig. 2 is a side elevation of the device shown in Fig. 1; Fig. 3 is a sectional view taken on line 3—3 of Fig. 1; Fig. 4 is a diagrammatic view showing the track with a turnout.

Like letters refer to like parts throughout the several figures.

In the use of rack rail locomotives the rack rail is ordinarily placed between the two traction rails, and when there is a turnout or crossing the track rail and the rack rail must necessarily cross each other (Fig. 4). This necessitates the opening of the rack rail so as to permit the passage of the track rail. Such a construction is shown, for example, in Figs. 1 and 2 wherein the ends A and B of the rack rail are separated to permit the passage of the track rail C, thus leaving a gap as it were, in the rack rail. Where rack rail locomotives have two sprocket wheels, which engage the rack and the conditions are such that the gap between the ends of the rack rail is short enough to permit the front sprocket wheel to engage one end of the rack before the other sprocket wheel leaves the other end, this gap can be left open, as shown for example, in Figs. 1 and 2. In view of the strain or pressure put upon the rack, however, some means must be provided for maintaining the correct pitch relation of the two ends. In mines the racks are usually so short that they cannot be held in place when opened up to permit the passage of the track rail. Any movement of either end A or B of the rack would put it in such a position that the sprocket would not engage the teeth thereof. In order to prevent such movement I provide a rigid connecting piece D which runs below the track rail C and which rigidly connects together the two ends A and B of the rack. The ends A and B of the rack are preferably specially formed, and are connected to the rack proper in any desired manner. As herein shown the said ends A and B, for example, are provided with teeth $A^1$, $B^1$ which are longer than the ordinary teeth of the rack, and are separated by elongated openings $A^2$, the teeth and the openings gradually decreasing in length from the open end toward the rack proper. The side connections between the teeth are beveled as shown at E, and the arrangement is preferably such that the inner and lower edge of one beveled surface is in line with the outer and upper edge of the adjacent beveled surface in passing from the open end toward the rack proper. This arrangement insures the sprocket wheel being brought into correct alinement before the rack proper is reached, for if the sprocket wheel is laterally displaced it will engage these beveled surfaces and be gradually moved into alinement.

In Figs. 1, 2 and 3 I have shown a rack rail which is also used as a conductor of the current used in operating the motor, and in such event it is necessary to insulate the rack rail. As herein shown the ends A and B are connected with insulating blocks F by the countersunk bolts $F^1$, and the connecting piece D is also connected with these insulating blocks so that the ends of the rack rail will be insulated, this latter connection consisting of the angle plates $F^2$ (see Fig. 2). As herein shown the teeth $A^1$, $B^1$ project below the upper part of the ends A and B as shown at G, and are all connected together by the piece $G^1$ which is fastened by the bolts $F^1$ to the insulating material. This leaves an open space below the main portion of the ends A and B. The pieces G are smaller in cross section than the teeth to which they are connected so as to make these open spaces larger than the spaces between the teeth. This provides a self-cleaning arrangement, thus preventing the spaces between the teeth from becoming filled with dirt or the like.

The ends of the rack rail are held down upon the supporting device in any desired manner, as, for example, by means of the bolts $D^1$ passing through the connecting piece D.

I claim:

1. A rack rail cut away so as to provide a gap for a track rail and means associated with the portions of the rack separated by the gap for preventing relative movement thereof to maintain the correct pitch relation between the teeth thereof.

2. A rack rail comprising two ends separated by a space to provide a gap through which a track rail may pass, a rigid connection between said ends below said track rail, and means for bringing the sprocket wheel into proper alinement.

3. A rack rail comprising two ends separated by a space to provide a gap through which a track rail may pass, a rigid connection between said ends below said track rail, the teeth of the rack at the ends being elongated and gradually decreasing in length, the connecting pieces between the teeth being provided with beveled faces, the outer beveled face on one side of a given tooth being in line with the inner beveled face on the other side of said tooth.

4. A rack rail comprising two ends separated by a space to provide a gap through which a track rail may pass, a rigid connection between said ends below said track rail, the teeth of the rack at the ends being elongated and gradually decreasing in length, the connecting pieces between the teeth being provided with beveled faces, the outer beveled face on one side of a given tooth being in line with the inner beveled face on the other side of said tooth, and means for insulating said ends from said connecting piece.

5. A rack rail provided with two ends separated by a space to provide a gap through which a track rail passes, means for rigidly connecting the ends of the rack rail together to maintain the correct pitch relation between the teeth thereof, the spaces between the teeth of said ends arranged so as to be self-cleaning.

6. In a rack railway a rack provided with ends separated by a gap, in combination with means for preventing relative movement between the ends so as to maintain the said ends in correct pitch relation at all times.

7. In a rack railway a rack provided with ends separated by a gap, in combination with means independent of the track construction for maintaining the said ends in correct pitch relation.

8. A rack rail comprising two ends separated by a space to provide a gap through which a track rail may pass, a rigid connection between said ends below said track rail.

9. A rack rail comprising two ends separated by a space to provide a gap through which a track rail may pass, a rigid connection between said ends below said track rail, the teeth of the rack at the ends being elongated and gradually decreasing in length.

10. A toothed rack rail provided with two ends separated by a gap, means for rigidly connecting the ends of the rack rail together to prevent relative movement thereof to maintain the correct pitch relation between the teeth of said ends, the spaces between the teeth of said ends arranged so as to be self-cleaning.

11. A rack rail comprising two ends separated by a space to provide a gap through which a track rail may pass, a rigid connection between said ends below said track rail, a supporting device for the ends of the rack rail and means for holding the ends of the rack rail down upon the supporting device.

NILS DAVID LEVIN.

Witnesses:
EDWARD T. WRAY,
DONALD M. CARTER.

Copies of this patent may be obtained for five cents each, by addressing the "Commissioner of Patents, Washington, D. C."